Patented May 7, 1946

2,399,653

UNITED STATES PATENT OFFICE 2,399,653

HYDROLYZED POLYMERS

John R. Roland, Jr., Wilmington, Del., assignor to E. I. du Pont de Nemours & Company, Wilmington, Del., a corporation of Delaware No Drawing. Application February 13, 1945, Serial No. 577,737

13 Claims. (Cl. 260—86)

This invention relates to partially hydrolyzed vinyl ester polymers and to a process for the controlled partial hydrolysis of vinyl ester polymers including vinyl ester homopolymers and interpolymers.

This application is a continuation-in-part of my copending application Serial No. 446,114, filed June 6, 1942.

I have discovered that solid, macromolecular, partially hydrolyzed interpolymers of ethylene with a vinyl ester of an organic monocarboxylic acid having the empirical formula $$(C_2H_4)_x.(C_2H_3OH)_y.(C_2H_3OR)_z$$

wherein R is an acyl radical of an organic monocarboxylic acid and $x$, $y$ and $z$ are numbers, the ratio of $y+z$ to $x$ being within the range of from 1:5 to 50:1 (i. e. the mol ratio of vinyl ester to ethylene in the interpolymer prior to hydrolysis being within the range of from 1:5 to 50:1) and the ratio of $y$ to $z$ being within the range of from 1:9 to less than 4:1 (i. e. the interpolymer being at least 10% but less than 80%, e. g., 79%, hydrolyzed), are particularly useful in the preparation of calendered fabric compositions. Said partially hydrolyzed interpolymers can be obtained by partially hydrolyzing interpolymers of ethylene with a vinyl ester of an organic monocarboxylic acid, in which the mol ratio of vinyl ester to ethylene is within the range of from 1:5 to 50:1, according to the hydrolyzing procedures set out in my copending application Serial No. 577,736, filed Feb. 13, 1945.

For instance, partial hydrolysis of most of said interpolymers can be effected by heating the interpolymer dissolved in a primary alcohol which is liquid at 25° C., such as methanol or ethanol, or in a mixture of said alcohol and a hydrocarbon such as toluene, containing at least 25% by weight of said alcohol, said solution containing a suitable hydrolyzing agent or catalyst, such as alkali or mineral acid. The remainder of said interpolymers, which are relatively resistant to mild hydrolyzing conditions, can be partially hydrolyzed in ether-splitting reagents, e. g. hydrobromic acid or hydrochloric acid, under pressure at elevated temperatures.

While each of the aforementioned partially hydrolyzed interpolymers can be obtained by said conventional hydrolyzing processes, 10% to 80% hydrolyzed interpolymers of ethylene with a vinyl ester of an organic monocarboxylic acid having the general formula R'COOH, wherein R' is of the group consisting of hydrogen atoms and hydrocarbon radicals, free from unsaturated linkages between acyclic carbon atoms, in which any carbon atom alpha to the carbon atom in the carboxyl group is attached to at least one but not more than three carbon atoms, can be obtained only with great difficulty by said conventional hydrolyzing processes. For instance, in the attempted preparation of said partially hydrolyzed interpolymers by the saponification of the interpolymer with an alkaline reagent such as an alkali hydroxide in a primary alcohol solution, the hydrolysis is much greater than that which can be accounted for on the basis of reaction of the ester group with alkali hydroxide. For example, an amount of alkali hydroxide theoretically capable of reacting with 10% of the total ester groups in such a vinyl ester interpolymer may result in the hydrolysis of 80%–90% or more of the total ester groups. Accordingly, by such a process, the partially hydrolyzed interpolymers can be obtained only with great difficulty.

I have now discovered a process whereby the aforementioned solid, macromolecular, partially hydrolyzed interpolymers having the empirical formula $(C_2H_4)_x.(C_2H_3OH)_y.(C_2H_3OR)_z$, wherein R is an acyl radical of an organic monocarboxylic acid having the general formula R'COOH, in which R' is of the group consisting of hydrogen atoms and hydrocarbon radicals, free from unsaturated linkages between acyclic carbon atoms, in which any carbon atom alpha to the carbon atom in the carboxyl group of said acid is attached to at least one but not more than three carbon atoms, and wherein $x$, $y$ and $z$ are numbers, the ratio of $y+z$ to $x$ being predetermined and being within the range of from 1:5 to 50:1, and the ratio of $y$ to $z$ being predetermined and being within the range of from 1:9 to less than 4:1, can be obtained readily. I have further discovered that said process is applicable broadly to solid, macromolecular homopolymers of vinyl esters of organic monocarboxylic acids, provided said acids have the general formula R'COOH wherein R' is of the group consisting of hydrogen atoms and hydrocarbon radicals, free from unsaturated linkages between acyclic carbon atoms, in which any carbon atom alpha to the carbon atom in the carboxyl group of said acid is attached to at least one but not more than three carbon atoms; and that said process is also applicable to interpolymers of said esters with other polymerizable compounds in which the mol ratio of vinyl ester to other polymerizable compound is at least 1:20.

The aforementioned vinyl ester homopolymers may be had by heating the ester at a temperature of about 100° C. in the presence of a peroxy catalyst, e. g., benzoyl peroxide. The interpolymers are obtained readily by heating a mixture of the vinyl ester and other polymerizable compound at about 100° C. or less in the presence of a peroxy catalyst; said heating being effected under superatmospheric pressure, when said other polymerizable compound is a gas, e. g., under a partial pressure as to said other polymerizable compound of 500–1000 atmospheres.

This invention has an object partially hydrolyzed interpolymers of ethylene with a vinyl ester of an organic monocarboxylic acid. Another object is the provision of a process for obtaining partially hydrolyzed vinyl organic ester homopolymers and interpolymers. A further object is the provision of a process whereby polymerized vinyl organic esters and interpolymers of a vinyl organic ester and another polymerizable compound may be partially hydrolyzed to a predetermined extent. A still further object is the provision of a process for the partial hydrolysis of polymerized vinyl acetate and interpolymers of vinyl acetate with another polymerizable compound. A still further object is the provision of a process for the partial hydrolysis of ethylene/vinyl acetate interpolymers. Additional objects will become apparent from an examination of the following description and claims.

These and other objects and advantages are accomplished according to the herein-described invention which comprises a solid, macromolecular, partially hydrolyzed interpolymer of ethylene with a vinyl ester of an organic monocarboxylic acid, said hydrolyzed interpolymer having the empirical formula $(C_2H_4)_x.(C_2H_3OH)_y.(C_2H_3OR)_z$, wherein R is an acyl radical of an organic monocarboxylic acid and $x$, $y$ and $z$ are numbers, the ratio of $y+z$ to $x$ being within the range of from 1:5 to 50:1, and the ratio of $y$ to $z$ being within the range of from 1:9 to less than 4:1. In a more restricted embodiment, R in the aforementioned empirical formula is an acyl radical of an organic monocarboxylic acid having the general formula R′COOH wherein R′ is of the group consisting of hydrogen atoms and hydrocarbon radicals, free from unsaturated linkages between acyclic carbon atoms, in which any carbon atom alpha to the carbon atom in the carboxyl group of said acid is attached to at least one, but not more than three, carbon atoms. In one preferred embodiment, R in the aforementioned empirical formula is

The process of the herein-described invention comprises heating a mixture of a strong base and a solid, macromolecular, vinyl organic monocarboxylic ester polymer, said polymer being of the group consisting of homopolymers of vinyl esters of monocarboxylic acids having the general formula R′COOH, wherein R′ is of the group consisting of hydrogen atoms and hydrocarbon radicals, and interpolymers of said vinyl esters with another polymerizable compound which contains at least one ethylenically unsaturated linkage, said acid R′COOH being free from unsaturated linkages between acyclic carbon atoms, any carbon atom alpha to the carbon atom in the carboxyl group of said acid being attached to at least one but not more than three carbon atoms, said heating being effected in the substantial absence of a primary alcohol in a medium containing at least 10% by weight of a saturated alcohol which contains not less than three and not more than six carbon atoms and wherein each hydroxyl group is attached to a carbon atom which is in turn attached to at least two but not more than three carbon atoms.

One preferred embodiment of this invention comprises heating in the substantial absence of a primary alcohol a solid, macromolecular interpolymer of ethylene with vinyl acetate in which the molar ratio of vinyl acetate to ethylene is between 1:10 and 20:1, said interpolymer being dissolved in a liquid medium containing potassium hydroxide and at least 20% by weight of a saturated straight chain aliphatic secondary alcohol containing not less than three and not more than six carbon atoms.

Another preferred embodiment of this invention comprises heating in the substantial absence of a primary alcohol solid, macromolecular, polymerized vinyl acetate dissolved in a liquid medium containing potassium hydroxide and at least 20% by weight of a saturated straight chain aliphatic secondary alcohol containing not less than three and not more than six carbon atoms.

By the term "polymer," as employed herein and in the appended claims, is meant a macromolecular organic compound containing a plurality of recurring units. More specifically, a polymer is an organic compound having a degree number, i. e. a degree of polymerization, as defined by Staudinger in Die hochmolekularen organischen Verbindungen (1932) cited by Marvel and Horning in 1 Gilman, Organic Chemistry (2d ed. 1943) 741, of at least 100. A "homopolymer" is a polymer in which said recurring units are the same; while an "interpolymer" is a polymer in which said recurring units are different.

By the expression "polymerizable compound which contains at least one ethylenically unsaturated linkage," as used herein and in the appended claims, is meant an organic compound which contains at least one C=C double bond which is not present in a benzene nucleus, i. e., at least one ethylenic double bond, said compound having the property of polymerizing to yield a macromolecular organic compound containing a plurality of recurring units which are joined together in a chain-like manner, i. e., products having a degree of polymerization of at least 100.

By the term "strong base" as employed herein and in the appended claims is meant a compound which yields hydroxyl ions in aqueous solution and has a basic dissociation constant greater than $1 \times 10^{-5}$.

In general, the partial hydrolysis is carried out by dissolving the polymeric vinyl ester in a solution containing substantial amounts of a saturated secondary or tertiary aliphatic or cycloaliphatic alcohol. In the case of such interpolymers as ethylene/vinyl acetate interpolymers, an aromatic hydrocarbon such as benzene or toluene is preferably employed to aid in dissolving the polymeric material. To the solution of the polymer there is added the desired amount of an alkali metal hydroxide or alkali metal carbonate in aqueous solution. In some cases the alkaline reagent may be dissolved in a saturated secondary or tertiary alcohol. The amount of the alkaline reagent added is usually slightly less than that calculated to give the desired amount of hydrolysis. The hydrolysis operation may be carried out by heating the solution of the vinyl ester homopolymer or interpolymer in the secondary or tertiary alcohol in the presence of an alkali for a period of at most a few hours. The partially hydrolyzed vinyl ester product is usually obtained from the solution by washing with water to remove any alkali metal compounds and with subsequent evaporation of the water or any solvent that may have been employed.

The following examples, in which proportions are in parts by weight unless otherwise specified, are given for illustrative purposes and are not intended to place any restrictions on the herein-described invention.

EXAMPLE I

A solution was prepared which consisted of 50 parts of an ethylene/vinyl acetate interpolymer of molar ratio of vinyl acetate to ethylene of 1:2.3 dissolved in about 175 parts of benzene and 80 parts of isopropyl alcohol. To this solution were added 7.5 parts of potassium hydroxide dissolved in 80 parts of isopropyl alcohol This amount of potassium hydroxide should theoretically result in hydrolysis of 40% of the acetate group of the interpolymer. The solution was refluxed for 1½ hours and the solution subjected to steam distillation to remove the benzene and isopropyl alcohol. The coagulated polymer obtained was washed with cold water and finally with hot water on a rubber mill. The dried polymeric product was pliable and readily molded into films, etc. The following table illustrates the difference in properties of the hydrolyzed product when hydrolysis was carried out as indicated above as compared to a similar hydrolysis carried out under the same conditions with the exception that methanol was employed in place of isopropyl alcohol.

*Table I*

| | Product prepared in isopropyl alcohol | Product prepared in methanol |
|---|---|---|
| Theoretical hydrolysis_____per cent__ | 40 | 40 |
| Actual hydrolysis_____do___ | 51 | 86.5 |
| Cold crack_____°C__ | Below −60 | −60 |
| Tensile strength_____lbs./sq. in__ | 1,725 | 4,320 |
| Elongation_____per cent__ | 764 | 504 |
| Pliability (10⁴/Young's modulus in lbs./sq. in.)_____ | 1,905 | 55 |
| Relative viscosity (0.5% in cresol)_____ | 1.655 | 1.596 |

The ethylene/vinyl acetate interpolymer, such as used in the preparation of the partially hydrolyzed product described above, is prepared by the controlled addition of ethylene at about 1000 atms. pressure at about 65° C. to vinyl acetate containing a small amount of benzoyl peroxide as a catalyst.

EXAMPLE II

A series of solutions was prepared, each consisting of about 40 parts of an ethylene/vinyl acetate interpolymer of molar ratio of vinyl acetate to ethylene of 1:2.6 dissolved in approximately 265 parts of benzene and to which a calculated quantity of potassium hydroxide dissolved in 160 parts of isopropyl alcohol was added. The resulting solutions were heated to reflux for a period of about 2 hours after which time the solvents were removed by steam distillation and the products washed and dried on a rubber mill. The following table shows the difference between the amounts of hydrolysis as calculated on the basis of the potassium hydroxide added and the amount found.

*Table II*

| Number | Calculated hydrolysis | Found hydrolysis |
|---|---|---|
| | Per cent | Per cent |
| A | 10.3 | 13 |
| B | 20 | 26 |
| C | 42 | 47 |
| D | 60 | 63 |
| E | 85 | 79 |

EXAMPLE III

A solution was prepared by dissolving 43 parts of polyvinyl acetate in 172 parts of tertiary butyl alcohol. The solution was heated with stirring on a steam bath and 4.2 parts of potassium hydroxide in 12 parts of water were added slowly through a dropping funnel to the hot solution. The reaction mixture was gently refluxed on the steam bath for 1½ hours and poured into water at the end of this period. The precipitated polymer was washed repeatedly with water until the water washings were neutral to litmus. The polymer was dried in vacuum. The polymer had a saponification number of 588, corresponding to 17.4% hydrolysis. This compares to the theoretical amount of hydrolysis of 15% as calculated from the amount of potassium hydroxide employed.

While this invention has been illustrated with particular reference to vinyl acetate homopolymers and interpolymers, it is to be understood that any solid, macromolecular, polymerized vinyl ester of a monocarboxylic acid having the general formula R'COOH, wherein R' is of the group consisting of hydrogen atoms and hydrocarbon radicals, and any solid, macromolecular interpolymer of said vinyl ester with another polymerizable compound which contains at least one ethylenically unsaturated linkage, in which interpolymer the molar ratio of said vinyl ester to said other polymerizable compound is greater than 1:20, may be hydrolyzed according to the process of this invention provided said acid R'COOH is free from unsaturated linkages between acyclic carbon atoms and any carbon atom alpha to the carbon atom in the carboxyl group of said acid is attached to at least one, but not more than three, carbon atoms. However, on account of the superior products had therewith, I prefer to employ monocarboxylic acids (of the formula R'COOH) which have the general formula $C_nH_{2n+1}COOH$, wherein $n$ is a positive integer within the range of from 1 to 6. Included among examples of esters useful in the preparation of homopolymers and interpolymers adapted for hydrolysis according to this invention are: vinyl formate, vinyl acetate, vinyl propionate, vinyl benzoate, vinyl butyrate, vinyl stearate, vinyl cyclohexanoate, vinyl isobutyrate, vinyl palmitate, vinyl myristate, vinyl toluate, vinyl naphthoate and the like.

Interpolymers of the aforementioned vinyl esters with other polymerizable compounds containing at least one ethylenically unsaturated linkage may also be hydrolyzed by the process of this invention provided the interpolymer contains less than 20 mols of other polymerizable compound per mol of vinyl ester. Included among examples of said other polymerizable compounds which may be copolymerized with a vinyl ester to give interpolymers which may then be partially hydrolyzed by the process herein described are: vinyl and vinylidene compounds having an open chain monoethylenically unsaturated group (i. e., a terminal methylene group), such as methyl methacrylate, acrylonitrile, methacrylonitrile, vinyl chloride, vinylidene chloride, propylene, isobutylene, and the like.

For ease of operation it has been found that interpolymers of ethylene with vinyl acetate are particularly desirable for use in the herein described partial hydrolysis method. Particularly useful are those interpolymers in which the mol ratio of vinyl acetate to ethylene is within the range of from 1:10 to 20:1.

As indicated in the examples, the process of this invention may be carried out by dissolving the polymer in a solvent containing the hydrolytic reagent and a substantial amount of the secondary or tertiary alcohol. In addition to isopropyl and tertiary butyl alcohol indicated in the above examples, any secondary or tertiary aliphatic alcohol or cycloaliphatic alcohol which contains not less than three and not more than six carbon atoms may be employed. These include cyclohexanol, secondary butyl alcohol, secondary amyl alcohol, secondary hexyl alcohols, etc. In general, the secondary and tertiary aliphatic or cycloaliphatic alcohols adapted for use in the process of this invention are those which have not less than 3 and not more than 6 carbons and which have the general formula

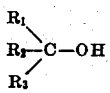

where $R_1$ can be hydrogen or an alkyl and $R_2$ and $R_3$ are alkyl groups ($R_2$ and $R_3$ together with the carbon atom shown may form a cyclic ring). Preferably the alcohols are free from other functional groups. In general, the alcohol is chosen so that it is a solvent or a partial solvent for the polymeric material as well as capable of dissolving some of the alkaline hydrolytic reagent or an aqueous solution thereof. Other solvents such as aromatic solvents, e. g., benzene or toluene, or chlorinated hydrocarbon solvents may also be employed to aid in dissolving the polymeric material. It is preferred that the secondary or tertiary aliphatic alcohol be present in quantities at least greater than ⅕ of the total solvent employed. The solvents employed should be capable of being readily removed from the hydrolyzed polymer, e. g., by evaporation, steam distillation, extraction with water, or precipitation of the polymer by the addition of a non-solvent for the polymer. The latter method is especially useful when highly hydrolyzed products are prepared.

Hydrolysis may be effected by any strong base, i. e., any alkaline-reacting compound which has a basic dissociation constant of greater than $1\times10^{-5}$. Included among examples of said strong bases are: alkali metal hydroxides, e. g., sodium hydroxide, potassium hydroxide, and lithium hydroxide; alkaline earth metal hydroxides, e. g., calcium hydroxide and barium hydroxide; alkali metal carbonates, e. g., sodium carbonate, potassium carbonate and lithium carbonate; ammonium hydroxide; amines, e. g., dimethyl amine, methyl amine, and trimethyl amine; guanidine; quaternary ammonium hydroxides, e. g., tetramethylammonium hydroxide; tertiary sulfonium hydroxides, e. g., trimethylsulfonium hydroxide; and the like. The hydrolysis may be carried out at any temperature from room temperature, e. g., 20° C., to the refluxing temperature of the mixture. Although it is preferable to carry out the reaction at ordinary pressures, superatmospheric pressure may be employed with corresponding increased temperatures which can result in a reduction of time for the reaction to a few minutes. For example, at such temperatures as 100-150° C. the time for the reaction is shorter than at temperatures of 50-100° C. In general, the reaction is finished in a period of less than two hours when a temperature in excess of room temperature is employed. It is preferred that the reaction mixture be stirred vigorously during the hydrolysis to maintain homogeneity of the reaction mixture and to give reproducible products.

The novel, partially hydrolyzed interpolymers of this invention have the empirical formula

wherein R is an acyl radical of an organic monocarboxylic acid and $x$, $y$ and $z$ are numbers, the ratio of $y+z$ to $x$ being within the range of from 1:5 to 50:1 (i. e. the mol ratio of vinyl ester to ethylene in the interpolymer prior to hydrolysis being within the range of from 1:5 to 50:1), and the ratio of $y$ to $z$ being within the range of 1:9 to less than 4:1 (i. e. the interpolymer being hydrolyzed in an amount within the range of from 10% to less than 80%, e. g., 79%). Included among examples of said organic monocarboxylic acids are: formic, acetic, propionic, butyric, stearic, benzoic, cyclohexanoic, isobutyric, palmitic, myristic, toluic, naphthoic, campholic, acrylic and chloroacetic acids and the like.

While substantial effects are had from partially hydrolyzed interpolymers having the empirical formula $(C_2H_4)_x.(C_2H_3OH)_y.(C_2H_3OR)_z$, as hereinbefore defined, wherein R is an acyl radical of any organic monocarboxylic acid, preferred partially hydrolyzed interpolymers and those which are obtained more readily are those in which R has the general formula

in which R' is of the group consisting of hydrogen atoms and hydrocarbon radicals, free from unsaturated linkages between acyclic carbon atoms, in which any carbon atom alpha to the carbon atom in the carbonyl group of the acyl radical is attached to at least one, but not more three, carbon atoms. Partially hydrolyzed interpolymers having the empirical formula

as hereinbefore defined, in which R has the general formula

wherein $n$ is a positive integer within the range of from 1 to 6, are most readily obtained and have very desirable properties. Partially hydrolyzed interpolymers in which R is

are obtained most economically and are, therefore, preferred in most instances.

Partially hydrolyzed interpolymers, having the empirical formula

in which R is an acyl radical of an organic monocarboxylic acid and $x$, $y$ and $z$ are numbers, the ratio of $y+z$ to $x$ being within the range of from 1:5 to about 6:1 and the ratio of $y$ to $z$ being within the range of from 1:9 to less than 4:1, are of special interest in that they are characterized by substantial insolubility in both hot and cold water. Of said partially hydrolyzed interpolymers, those in which the ratio of $y+z$ to $x$ is within the range of from 1:3 to 3:1, are of particular importance, optimum results being obtained with partially hydrolyzed interpolymers in which said ratio is within the restricted range of from 1:3 to 1:2.

The partially hydrolyzed products had in accordance with this invention may be used in the preparation of adhesives, coatings or calendered fabric compositions. Solutions of the partially hydrolyzed products can be coated on paper. Non-fibrous films, such as regenerated cellulose films, lowly etherified or esterified cellulose films, polyvinyl alcohol film or the like may also be similarly coated and, if desired, the base film may be impregnated or otherwise treated with an anchoring agent to improve the bond between the base film and the coating. Because of their low temperature toughness and pliability characteristics, the partially hydrolyzed vinyl esters of this invention may be employed as safety glass interlayers. Plasticizers may be added; however, choice of the amount of hydrolysis gives products having exceptional pliability which do not require added plasticization for most uses. Other products such as fibers, films, molded objects, etc. may be prepared. The compositions of this invention which have substantial amounts of hydroxyl groups may furthermore be subjected to insolubilization or curing by means of crosslinking reagents.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. A solid, macromolecular, partially hydrolyzed interpolymer of ethylene with a vinyl ester of an organic monocarboxylic acid, said partially hydrolyzed interpolymer having the empirical formula $(C_2H_4)_x.(C_2H_3OH)_y.(C_2H_3OR)_z$, wherein R is an acyl radical of an organic monocarboxylic acid and $x$, $y$ and $z$ are numbers, the ratio of $y+z$ to $x$ being within the range of from 1:5 to 50:1 and the ratio of $y$ to $z$ being within the range of from 1:9 to less than 4:1.

2. A solid, macromolecular, partially hydrolyzed interpolymer of ethylene with a vinyl ester of an organic monocarboxylic acid, said partially hydrolyzed interpolymer having the empirical formula

wherein R' is of the group consisting of hydrogen atoms and hydrocarbon radicals, free from unsaturated linkages between acyclic carbon atoms, in which any carbon atom alpha to the carbon atom in the carbonyl group is attached to at least one, but not more than three, carbon atoms, and wherein $x$, $y$ and $z$ are numbers, the ratio of $y+z$ to $x$ being within the range of from 1:5 to 50:1, and the ratio of $y$ to $z$ being within the range of from 1:9 to less than 4:1.

3. A solid, macromolecular, partially hydrolyzed interpolymer of ethylene with a vinyl ester of an organic monocarboxylic acid, said partially hydrolyzed interpolymer having the empirical formula

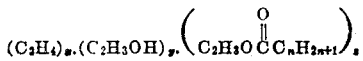

wherein $n$ is a positive integer within the range of from 1 to 6 and $x$, $y$ and $z$ are numbers, the ratio of $y+z$ to $x$ being within the range of from 1:5 to 50:1, and the ratio of $y$ to $z$ being within the range of from 1:9 to less than 4:1.

4. A solid, macromolecular, partially hydrolyzed interpolymer of ethylene with vinyl acetate, said partially hydrolyzed interpolymer having the empirical formula

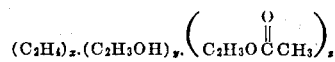

wherein $x$, $y$ and $z$ are numbers, the ratio of $y+z$ to $x$ being within the range of from 1:5 to 50:1 and the ratio of $y$ to $z$ being within the range of from 1:9 to less than 4:1.

5. A solid, macromolecular, partially hydrolyzed interpolymer of ethylene with vinyl acetate, said partially hydrolyzed interpolymer having the empirical formula

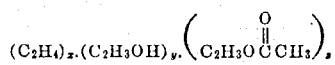

wherein $x$, $y$ and $z$ are numbers, the ratio of $y+z$ to $x$ being within the range of from 1:5 to about 6:1 and the ratio of $y$ to $z$ being within the range of from 1:9 to less than 4:1.

6. A solid, macromolecular, partially hydrolyzed interpolymer of ethylene with vinyl acetate, said partially hydrolyzed interpolymer having the empirical formula

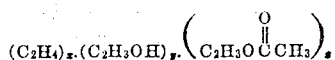

wherein $x$, $y$ and $z$ are numbers, the ratio of $y+z$ to $x$ being within the range of from 1:3 to 1:2 and the ratio of $y$ to $z$ being within the range of from 1:9 to less than 4:1.

7. The process for obtaining a solid, macromolecular, partially hydrolyzed vinyl polymer, which comprises heating a mixture of a strong base and a solid, macromolecular vinyl organic ester polymer, said polymer being of the group consisting of homopolymers of vinyl esters of monocarboxylic acids having the general formula R'COOH, wherein R' is of the group consisting of hydrogen atoms and hydrocarbon radicals, and interpolymers of said vinyl esters with another polymerizable compound which contains at least one ethylenically unsaturated linkage, said acid R'COOH being free from unsaturated linkages between acyclic carbon atoms, any carbon atom alpha to the carbon atom in the carboxyl group of said acid being attached to not more than three carbon atoms, said heating being effected in a medium containing at least 10% by weight of a saturated alcohol which contains not less than three and not more than six carbon atoms, each hydroxyl group in said saturated alcohol being attached to a carbon atom which is in turn attached to at least two carbon atoms.

8. The process for obtaining a solid, macromolecular, partially hydrolyzed vinyl polymer, which comprises heating a mixture of an alkali metal hydroxide and a solid, macromolecular vinyl organic ester polymer, said polymer being of the group consisting of homopolymers of vinyl esters of monocarboxylic acids having the general formula $C_nH_{2n+1}COOH$, wherein $n$ is a positive integer within the range of from 1 to 6, and interpolymers of said vinyl esters with another polymerizable compound containing a terminal methylene group, said heating being effected in the substantial absence of a primary alcohol in a medium containing at least 10% by weight of a saturated monohydric alcohol which contains not less than three and not more than six carbon atoms, the hydroxyl group in said alcohol being attached to a carbon atom which is in turn attached to at least two carbon atoms.

9. The process for obtaining a solid, macromolecular, partially hydrolyzed vinyl acetate polymer, which comprises heating a mixture of an alkali metal hydroxide and a solid, macromolecular homopolymer of vinyl acetate, said heating being effected in the substantial absence of a primary alcohol in a medium containing at least 20% by weight of a saturated monohydric alcohol which contains not less than three and not more than six carbon atoms, the hydroxyl group in said alcohol being attached to a carbon atom which is in turn attached to at least two carbon atoms.

10. The process for obtaining a solid, macromolecular, partially hydrolyzed vinyl acetate polymer, which comprises, heating in the substantial absence of a primary alcohol, a solid, macromolecular homopolymer of vinyl acetate dissolved in a liquid medium containing potassium hydroxide and at least 20% by weight of a straight chain saturated aliphatic secondary alcohol containing not less than three and not more than six carbon atoms.

11. The process for obtaining a solid, macromolecular, partially hydrolyzed interpolymer of vinyl acetate and another polymerizable compound containing a terminal methylene group, which comprises heating a mixture of an alkali metal hydroxide and a solid, macromolecular interpolymer of vinyl acetate with another polymerizable compound which contains a terminal methylene group, the mol ratio of vinyl ester to other polymerizable compound in said interpolymer being greater than 1:20, said heating being effected in the substantial absence of a primary alcohol in a medium containing at least 20% by weight of a saturated monohydric alcohol which contains not less than three and not more than six carbon atoms, the hydroxyl group in said alcohol being attached to a carbon atom which in turn is attached to at least two carbon atoms.

12. The process for obtaining a solid, macromolecular, partially hydrolyzed ethylene/vinyl acetate interpolymer, which comprises heating in the substantial absence of a primary alcohol, a solid, macromolecular interpolymer of ethylene with vinyl acetate in which the mol ratio of vinyl acetate to ethylene is between 1:10 and 20:1, dissolved in a liquid medium containing an alkali metal hydroxide and at least 20% by weight of a saturated monohydric alcohol which contains not less than three and not more than six carbon atoms, the hydroxyl group in said alcohol being attached to a carbon atom which is in turn attached to at least two carbon atoms.

13. The process for obtaining a solid, macromolecular, partially hydrolyzed ethylene/vinyl acetate interpolymer, which comprises heating in the substantial absence of a primary alcohol, a solid, macromolecular interpolymer of ethylene with vinyl acetate in which the mol ratio of vinyl acetate to ethylene is between 1:10 and 20:1, dissolved in a liquid medium containing potassium hydroxide and at least 20% by weight of a straight chain saturated aliphatic secondary alcohol containing not less than three and not more than six carbon atoms.

JOHN R. ROLAND, Jr.